455-4 AU 233 EX

PTU07 XR 3,623,003 # ited States Patent

[11] 3,623,003

Inventor Terry L. Hewitt
Schenectady, N.Y.

Appl. No. 16,085
Filed Mar. 3, 1970
Patented Nov. 23, 1971
Assignee General Electric Company

SUBSCRIBER-RESPONSE UNIT

13 Claims, 6 Drawing Figs.

U.S. Cl. ........ 340/172.5
Int. Cl. ........ H04g 3/00
Field of Search ........ 340/172.5, 151, 163

References Cited

UNITED STATES PATENTS

| | | | |
|---|---|---|---|
| ..31 | 8/1970 | Willcox et al. | 340/151 |
| ..28 | 4/1970 | Holden et al. | 340/163 |
| 3,541,513 | 11/1970 | Paterson | 340/172.5 X |
| 3,539,998 | 11/1970 | Belcher et al. | 340/172.5 |

*Primary Examiner*—Gareth D. Shaw
*Assistant Examiner*—R. F. Chapuran
*Attorneys*—John F. Ahern, Paul A. Frank, Julius J. Zaskalicky, Frank L. Neuhauser, Oscar B. Waddell and Joseph B. Forman ABSTRACT: A subscriber response unit (SRU) is disclosed wherein data may be communicated to and from a central control system or message center. The SRU responds only the received data properly address coded for that particular unit. Information entered into the SRU locally is automatically read out to the message center in response to an interrogation signal from the message center. The SRU is able to accept both high and low data input rates and can store information for future use. Further, the SRU can perform switching or controlling operations in response to properly address coded signals from the message center.

INVENTOR:
TERRY L. HEWITT,
by Paul A. Frank
HIS ATTORNEY

INVENTOR:
TERRY L. HEWITT,
by Paul A. Frank
HIS ATTORNEY

INVENTOR:
TERRY L. HEWITT,
by [signature]
HIS ATTORNEY

INVENTOR:
TERRY L. HEWITT,
by [signature]
HIS ATTORNEY

*INVENTOR:*
*TERRY L. HEWITT,*
*by* [signature]
*HIS ATTORNEY*

INVENTOR:
TERRY L. HEWITT,
by [signature]
HIS ATTORNEY

SUBSCRIBER-RESPONSE UNIT

This invention relates to a subscriber response unit for use in a digital information distribution system. Such a unit acts as an interface between a human user and a central information station. A system utilizing the subscriber response unit (SRU) is intended to complement audio/visual communication techniques, such as television, to provide the user with as complete an information interchange system as possible, this in addition to being used as an information interchange system in its own right.

In considering such a system, one must provide a subscriber response unit that is compatible with existing communication equipment and flexible in operation. Further, the SRU must be capable of accepting data from a variety of sources; for example, the high speed data rate of the message center and the relatively low speed data rate from a human operator. The multiple rate acceptability of an SRU is necessary to enable a large number of SRU's to be utilized with a single message center. The flexibility of operation is desirable so that the SRU may be applied to a wide variety of uses. For example, it is desirable to have an SRU that displays the information received or transmitted so that the user may readily use such information. Further, the unit should be compatible with a variety of input/output devices used to provide a human interface to the SRU and to perform a variety of operations automatically. Further, it is desirable to provide an SRU with the circuitry to carry out its functions with a minimum of error.

In view of the foregoing, it is therefore an object of the present invention to provide an SRU of maximum flexibility of operation.

It is a further object of the present invention to provide an SRU compatible with a wide variety of input/output devices.

It is another object of the present invention to provide an SRU compatible with existing communication technology.

It is a further object of the present invention to provide an SRU that is address-coded and capable of receiving very high data input rates so as to minimize the time of the message center that is occupied by a given SRU.

The foregoing objects are achieved in the present invention wherein there is provided an SRU comprising address recognition means, function selection means, data storage means, local data input means, display means, and clock converter means all interrelated so that the SRU can, upon being properly addressed by a signal from the message center, determine the function to be performed and carry it out. For example, if local information has been inserted by the local data input means and stored in the data storage register, the message center can address the particular SRU and request it to read out any local information it may contain. The particular SRU then performs this function and, upon indication of a correct transmission by the message center, receives a "clear" signal from the message center enabling the SRU to clear its data storage member of the transmitted information.

In addition to such information exchange functions, as exemplified by the above, the SRU can also perform a variety of control functions. For example, the particular SRU, suitably addressed, may be told to perform a particular switching function at its remote location. A suitable signal is then sent back to the message center indicating the performance of the assigned task. As is apparent from the above brief examples, the flexibility of the SRU is limited only by the input/output device used at its location.

A more complete understanding of the present invention may be obtained by considering the following detailed description taken in conjunction with the attached drawings in which.

The subscriber response unit is a terminal device used to communicate data to and from a central control system, or message center, via a CATV coaxial cable or comparable broadband communication link. In a typical communication system, one message center may act as the control center for thousands of SRU's. All of the SRU's are interrogated once each scanning cycle by the message center and the interrogations may take place over one or more of the channels available within the broadband communication link. Obviously, if desired, provision could be made for the interrogations to take place more or less frequently, depending upon subscriber usage. Thus, for example, an inactive SRU may be interrogated every second or third scanning cycle. This increases service to subscribers making use of their SRU and increases the number of SRU's that may be serviced by a message center.

Each SRU responds only to an input signal which contains its own unique "address." In the simplest form of system scanning, the "address" is different for each message transmitted, so that for each scanning cycle each of the SRU's in the system has been interrogated at least once. The input signal also contains information to command certain functions to be performed. As a result of these commands the SRU may transmit data back to the message center, it may cause incoming data to be displayed in some form at the subscriber's site, or it may initiate the performance of certain switching or controlling operations.

Figure 1:
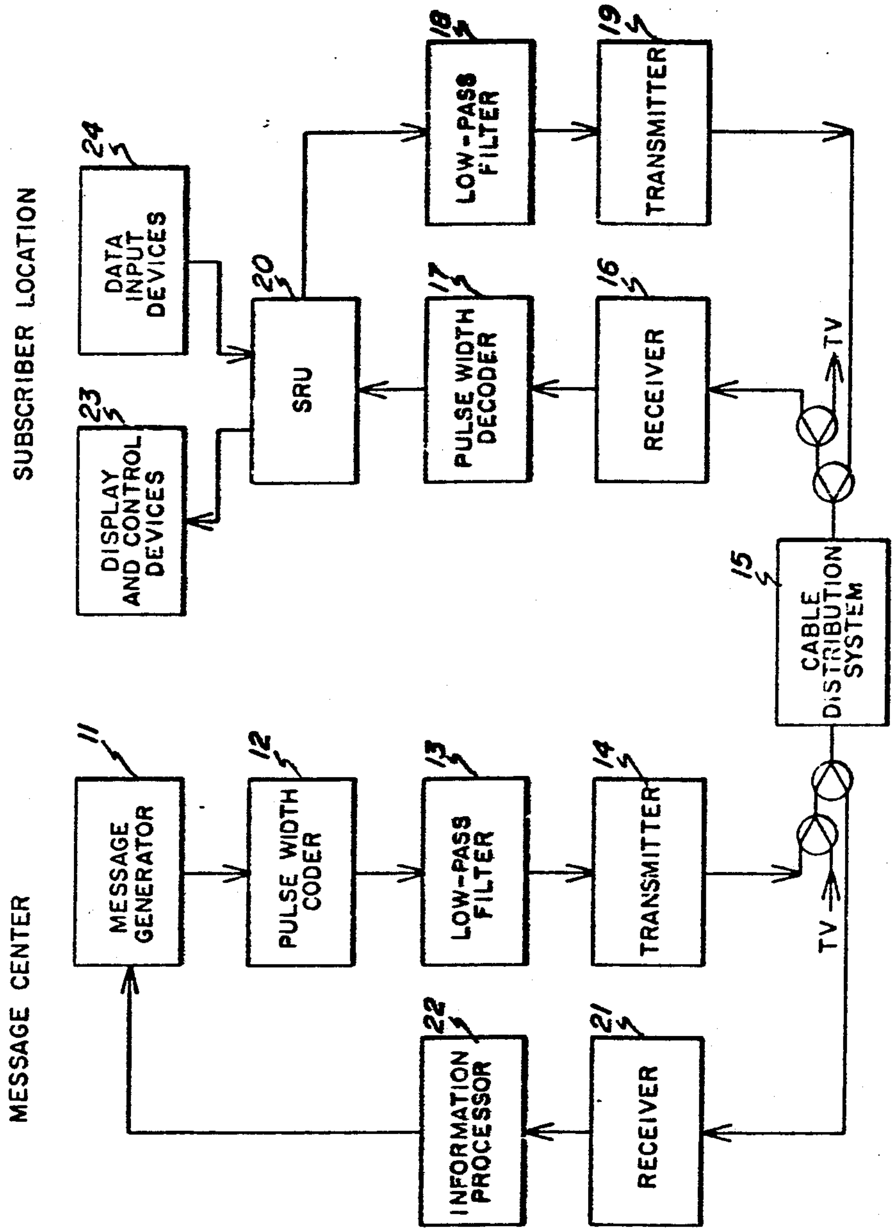
FIG. 1 illustrates a wideband information distribution system.

One type of system illustrating the cable communication concept is shown in FIG. 1. The message generator 11 at the message center generates the digital information to be transmitted to the SRU's through the coaxial network. This information consists of the clock, the address of the SRU, the function to be performed by the SRU, and any information which may be waiting for transmission to that particular SRU. In addition, a "reset" signal can be sent at the beginning of each message in order to separate messages and provide a means of synchronizing system operation.

The message format contains three parts: RESET, CLOCK, and DATA. These parts are combined into a pulse-width coded digital signal in coder 12. The coded signal is next filtered by a low-pass filter 13 to reduce the bandwidth requirements and thus increase the number of possible signal channels in the available frequency spectrum. With a pulse-width modulation format, the minimum bandwidth of the filter is twice that of the clock frequency in order to preserve the time relationship of the unfiltered signal.

A carrier signal is modulated by the output of the low-pass filter in transmitter 14 and the resulting amplitude-modulated signal is sent out over the cable distribution system 15. This signal may be combined with any other signals, including TV, to be transmitted in the forward direction. The current frequency band for transmission in the forward direction is about 30–250 mHz.

Upon arrival at the subscriber terminal, the signal is first separated by a receiver 16 and amplified. The resulting signal is then pulse width decoded in decoder 17 to produce the three separate signals which are sent to the SRU 20. These three signals are RESET, CLOCK, and DATA. The DATA signal contains the address, function, and any incoming information being sent to that terminal.

The SRU 20 then responds to the incoming signal. A common action is to send data back to the message center. The outgoing signal generated by the SRU can be left as a non-return-to-zero signal whose only function is to carry a return DATA signal. Since the system is synchronized there is no need to return the CLOCK and RESET components. The non-return-to-zero DATA signal is filtered by filter 18 and used to modulate a carrier for transmission by transmitter 19 in the reverse direction back to the message center. The reverse transmission band covers the frequency range of about 5–30 mHz. At the message center the signal is received in receiver 21 and processed by processor 22.

At the subscriber location, suitable display devices 23 serve to display the information locally entered into the SRU 20 by data input devices 24 and the information received from the message center. As will be more fully described below, the display devices 23 can be used to display the locally generated signal until it has been correctly received by the message center, upon interrogation therefrom. This serves to indicate to the operator that the message has been correctly received.

In summarizing the operation of the SRU, it should be noted that the SRU has two basic modes of operation, depending upon the manner in which data enters and leaves. The data may either be entered locally at the SRU (through a keyboard, for example) or may enter via the incoming signal from the message center. When data is entered locally, it is normally entered slowly and randomly, one alpha-numeric character at a time. When the SRU is interrogated, this information is read out and sent to the message center at a high data rate. Conversely, if the data is entered via the incoming signal it enters at a high data rate and is then used at the SRU in a variety of possible ways, usually at a relatively slow output data rate.

The wideband information distribution system, envisioned for use with the SRU, is a synchronized system so that proper operation and even keyboard data entry depends upon the presence of the signal from the message center, whether or not that particular SRU is being interrogated. Local entry of data, via a keyboard, for example, is synchronized by the incoming message but does not require that the message be addressed for that SRU. However, data entry into the SRU from the message center can occur only if the SRU is correctly addressed.

A number of operations within the SRU depend upon either, or both, of two features of the incoming signal. The first of these is the RESET pulse which occurs at the beginning of each message interval. The second feature is that the first bit of each message is always a logic "1."

The CLOCK signal provides the clock used for moving data through the SRU. There is no clock signal generated internally in the SRU. Thus, clock generator apparatus is eliminated as well as the synchronizing apparatus needed to synchronize a local clock with the incoming message.

The DATA signal coincides in time with the CLOCK signal. The first m bits of the DATA signal contain the FUNCTION information with the first bit always a logic "1," as mentioned previously. The next n bits contain the ADDRESS information. If data is to be entered into the SRU from the message center this data follows the ADDRESS, otherwise any bit sequence following the ADDRESS is disregarded by the SRU. In either case, the CLOCK must persist for a sufficient time after the end of the ADDRESS in order that data may be moved out of the SRU and sent to the message center.

As data is entered locally it is stored in the SRU until a TRANSMIT signal is given by the operator. The SRU then waits for the next message which contains a READ function and the same ADDRESS as that wired into the unit. The SRU will then respond by returning the incoming FUNCTION and ADDRESS code followed by bits representing the information locally entered into the SRU. As the stored information is transmitted out of the SRU it is also recirculated back into storage in the event it must be read again.

At the message center the return signal is processed and if the signal contains information in addition to the FUNCTION and ADDRESS bits which were sent, the message center will retransmit to the same SRU but this time with a CLEAR function code which will then automatically reset the SRU and clear the readout. This indicates to the user of the SRU that the message has been received at the message center.

At any time before the message is transmitted from the SRU information which has been entered via the keyboard may be cleared by entering a CLEAR signal into the SRU.

To transmit information from the message center for storage in the SRU the COMMAND function code is sent along with the ADDRESS code. When this combination occurs, the next following bits containing the information are entered into storage in the SRU.

Figure 2:
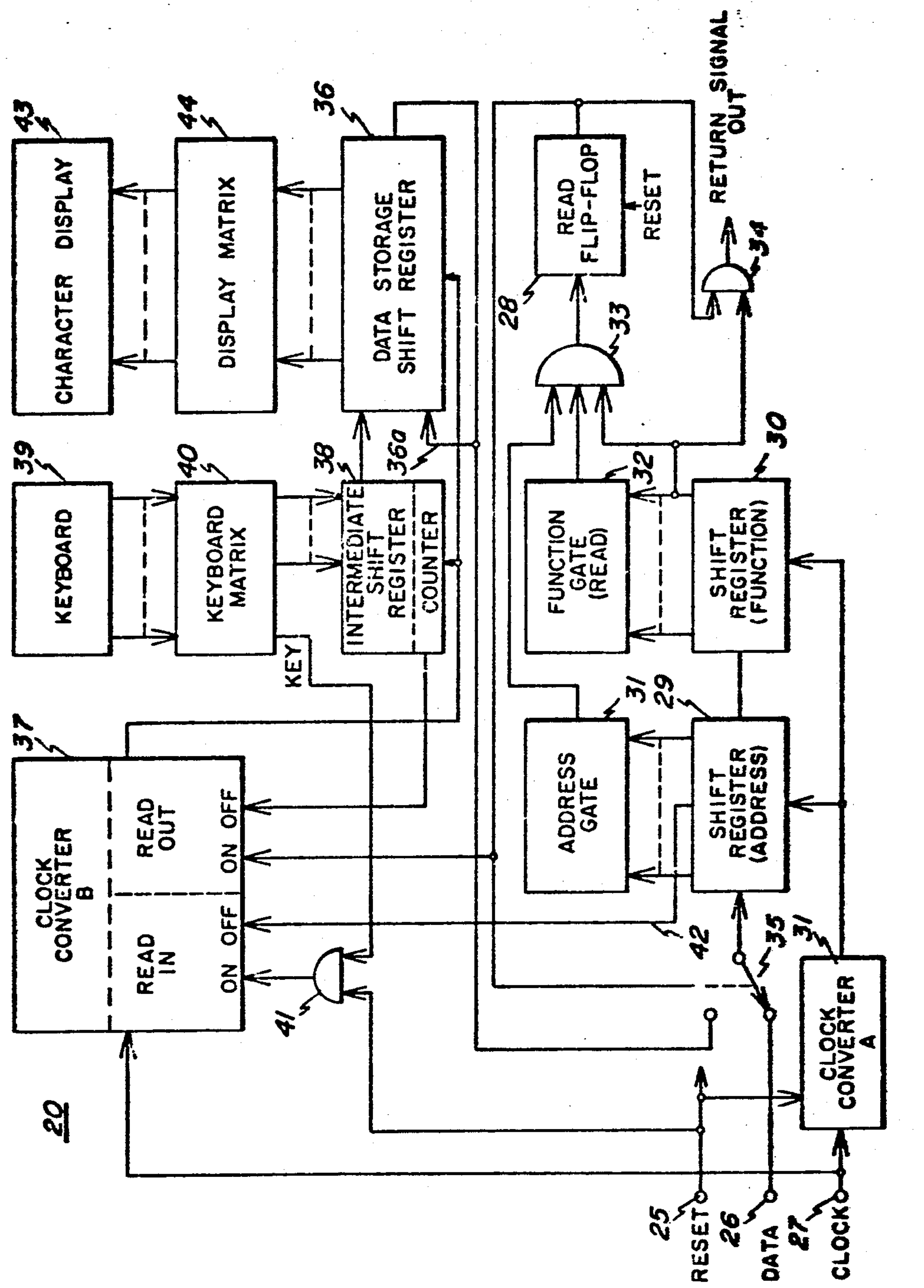
FIG. 2 is a simplified block diagram of an SRU showing keyboard data entry and "read" operation.

Most of the system operations of the SRU can be described through an explanation of the local data entry and READ operation. A simplified block diagram of this portion of the SRU is shown in FIG. 2.

The three components of the input from the message center are RESET, CLOCK, and DATA. Information entered at the SRU comes through local data input devices, such as a keyboard. Operation of the SRU when it is being interrogated by a READ signal will be considered first.

As pointed out in connection with FIG. 1, the pulse width decoder processes the signal at the subscriber's location and produces three separate signals: RESET, DATA, and CLOCK. These three signals are coupled, respectively, to three of the inputs 25, 26, and 27 to the SRU. The beginning of each message interval is marked by the RESET pulse. At this time a number of flip-flops are reset, including the READ flip-flop 28 shown in FIG. 2. The ADDRESS and FUNCTION shift registers 29 and 30, respectively, are also cleared of any previous data which they may still hold. The CLOCK and DATA signals follow the end of the RESET pulse. The CLOCK signal is first converted as may be necessary for driving the shift registers used in the SRU. An "A" clock converter 31 is used for providing this clock.

The clock pulses move the DATA signal through the ADDRESS shift register 29 and the FUNCTION shift register 30. After a given number of clock pulses, determined by the capacities of the registers 29 and 30, the registers are fully loaded with the DATA signal from input 26. The outputs of the shift registers 29 and 30 go to respective inputs of ADDRESS and FUNCTION gates 31 and 32, respectively. The particular function gate shown in FIG. 2 is the READ gate. There are two other function gates in the SRU, one for CLEAR and one for COMMAND.

If the incoming data signal contains the proper ADDRESS sequence for that particular SRU, the output of ADDRESS gate 31 will go to a logic "1." If the incoming data sequence contains the proper sequence for the READ function, the output of READ gate 32 will go to a logic "1." Also, as the last bit of data is shifted into the registers, the last (right-hand most) stage of the FUNCTION shift register will be a logic "1" because, as mentioned above, the first DATA bit is always a logic "1." The outputs of the ADDRESS and FUNCTION gates and the output of the last stage of the FUNCTION shift register are applied as inputs to AND gate 33, which acts as a read control gate. Since all the inputs are a logic "1," the output of AND gate 33 goes to a logic "1," thereby activating READ flip-flop 28.

The output of the READ flip-flop performs three functions. First, when the READ flip-flop goes into the logic "1" state, it opens gate 34 and allows the information to flow out of shift register 30, through gate 34, and out to the return transmitter for transmission to the message center. At the same time, the output of the READ flip-flop 28 causes switch 35 to change to the upper terminals, thus disconnecting the input of the ADDRESS shift register 29 from the incoming DATA signal and connecting it to the output of the data storage shift register 36.

The READ flip-flop 28 is also connected to the readout section of "B" clock converter 37. If the TRANSMIT signal has been locally entered, the clock converter will be turned on and the local clock output will transfer data out of the data storage shift register and into the ADDRESS shift register 29 from where it proceeds through the FUNCTION shift register gate 34, and on to the transmitter for transmission to the message center. As the data is being transferred out of the data storage shift register 36, it is also being recirculated back into the input of the shift register via input 36a so that after transmission the data will still be in the data storage shift register 36 in the event it must be read again. The "B" clock converter 37 will continue to produce clock pulses until it is turned off. This turnoff is accomplished by a pulse from the intermediate register and counter 38 which counts the number of clock pulses necessary to read out the data from data storage register 36, and then produces an output pulse. It is, of course, necessary that throughout this time the input CLOCK signal continues so that the local clock pulses may be generated. Thus, the output signal returned by the SRU to the message center in response to a READ signal comprises: the READ signal given, the ADDRESS of the SRU, and the locally stored information. This seemingly roundabout readout serves several important functions. For example, it acknowledges to the message center that the requested function is to be performed. Also, by having a read out of information in this manner, the source of the information is automatically identified since the ADDRESS signal precedes the information.

Any data in the data storage shift register 36 is the result of an entry from keyboard 39. As any one of the keys is pressed, the character is first converted to a binary coded output in keyboard matrix 40. This output is then transferred to the intermediate shift register 38 and stored. Depression of any of the keys also results in a KEY output from the keyboard matrix. This KEY pulse persists long enough to gate the next RESET pulse through gate 41 and thus turn on "B" clock converter 37.

The "B" clock converter then produces clock pulses which transfer the keyboard data out of the intermediate register-counter and into the data storage shift register. Note that since the RESET pulse is required, the keyboard data is not transferred into the storage shift register until the beginning of the message following the reset pulse. The clock pulses then being produced by converter 37 occur simultaneously with the clock pulses produced by converter 31. The first bit of the incoming data stream, which is a logic "1," is shifted through the ADDRESS shift register 29 and when this bit reaches intermediate tap 42 it results in an output which turns off "B" clock converter 37 through the read-in section. Thus only a sufficient number of clock pulses are produced by clock converter 37 to fully read out intermediate register 38 during a keyboard entry and the clock pulses shift the data out of temporary storage in the intermediate register-counter into the data storage shift register 36.

The contents of the data storage register are displayed on character display 43 after the data storage register outputs have been translated into a suitable format by display matrix 44. Data entered into the data storage register 36 will remain there until the SRU is cleared, accomplished either by locally entering a CLEAR signal into the SRU or by an incoming CLEAR signal from the message center. While the local entry of information requires a local clock signal, it should be noted that the clock is always available from the message center, whether or not the particular SRU is addressed.

For purposes of describing the operation of the SRU, the circuitry has been subdivided into a number of separate functions. The resulting functional block diagrams are shown in FIGS. 3–6. Each figure does not show all the actual interconnections between the functional units but merely enough interconnections to indicate the signal flow through the system. A composite of these four figures would, however, indicate the interconnections of the functional units.

The elements of FIGS. 3–6 are set forth below and briefly described. Then the mode of operation illustrated by each of FIGS. 3–6 will be described in detail. In FIGS. 3–6 the interrogation clock converter 45 receives the input CLOCK signal and converts it into a local clock signal suitable for clocking the ADDRESS and FUNCTION shift registers 29 and 30 and the return signal output shift register 46. A RESET pulse serves to clear all shift registers driven by this clock converter. There are two principal data messages handled within the SRU. One of these is contained in the incoming forward transmission signal and the second data message is that entered locally into the SRU via a keyboard or other input device. The local data is stored in shift registers for eventual transmission back to the message center. It is the function of the data delay circuit and switch 47 to operate upon these two data messages and route them into the address shift register at the appropriate time. The ADDRESS shift register and gate 29 provide an output only when the incoming interrogation signal contains the address code of the particular SRU being interrogated. An output from this circuit is required in order for any data to be sent back to the message center. The READ gate 48 is one of three function gates in the SRU. The READ function is used when the message center interrogates the SRU to see whether any information is ready to be transmitted back to the message center. The READ gate 48 responds each time the proper READ code appears in the incoming signal. However, response of the SRU to the READ signal also depends on whether the ADDRESS gate 29 has also responded. These conditions are satisfied when a flip-flop, called the message flip-flop (MFF) is switched to the logic "1" state. This flip-flop, in turn, controls a number of other circuits in the SRU.

Following the entry of keyboard data into the SRU data storage registers 36', the information will normally be sent to the message center on the next correctly addressed READ interrogation following local entry of a TRANSMIT signal into the SRU, under the control of the transmit-clear control circuit 49. There is one other input to the transmit section of this control and that is the TRANSMIT HOLD operation. The TRANSMIT HOLD signal comes from the keyboard or other input device. This assures that the SRU stays in the transmit mode when the keyboard is sending out information. When the keyboard or input device is in the receive or standby mode, no signal is applied to this input and there is not effect on the operation of the transmit circuit.

The COMMAND order is used to direct the SRU to take information coming in from the message center and store this information in the data storage shift registers 36'. This information may then be used to drive a display in the SRU, as, for example, a teletypewriter, or to control some remote function. REcognition of the COMMAND signal is performed by the command gate and flip-flop 50.

THe COMMAND gate 50 is a combination NOR-AND gate with its inputs taken from the FUNCTION shift register. If the outputs of the FUNCTION shift register are correct at the time the ADDRESS gate pulse is received then the COMMAND gate output will set the command flip-flop to the logic "1" state. As with the other functions, this assures that the SRU will respond only to a COMMAND signal intended for it and only at the proper time in the received signal period.

The local data section clock converter 51 provides the local clock signals for reading keyboard data into the data storage shift register 36', for entering data during a COMMAND order, and for moving the data out of the data storage shift register when the SRU is being read. Provision is also made for clearing the display shift registers to zero. The data storage shift registers 36' represents a combination of elements 36 and 38 as shown in FIG. 2.

THe read-in control circuit 52 produces one input to the clock control of the local data section clock converter 51 during entry of information. The readout control circuit 53 provides the second input to the local data section clock converter 51. The output of this circuit is from a readout flip-flop, contained therein, and it controls the generation of the local clock pulses for transferring the digital data stored in the data storage shift registers out of the registers for transmission back to the message center. A second use of the readout flip-flop is to control the clock when data are read into the SRU through the COMMAND function.

The character display 43 may comprise any suitable display device. If, for example, only numerals are to be displayed, a seven-bar display can be utilized. If both alphabetical and numerical characters are to be displayed, a slightly more complicated display arrangement is necessary. The character display 43 is fed by a display matrix 44 which serves as an interface between the intermediate register 38 and the character display 43.

Figure 3:
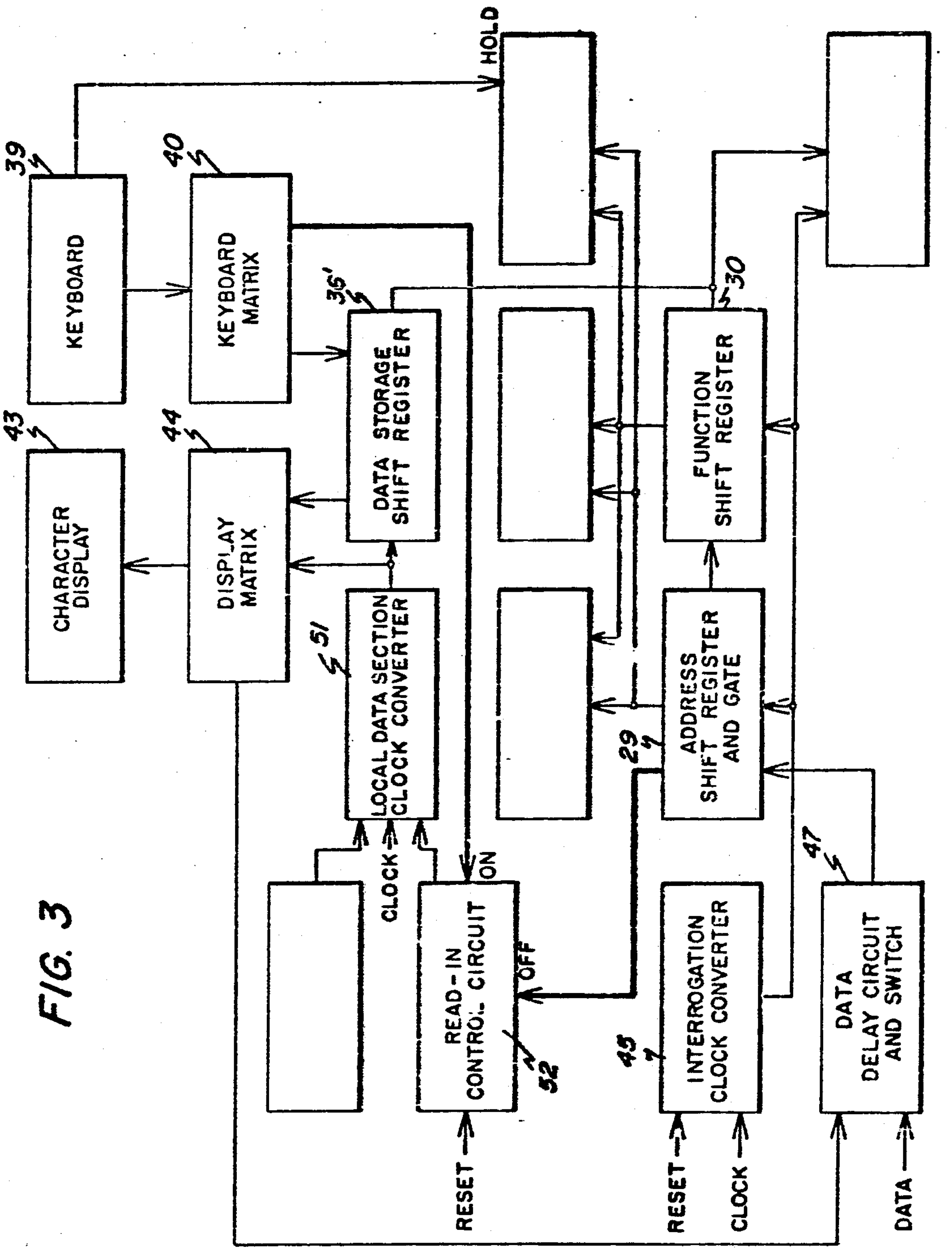
FIG. 3 is a functional block diagram of an SRU illustrating data entry.

Considering the various modes of operation of the SRU in detail, FIG. 3 illustrates the local data entry mode in which information at the subscriber's location is inserted into the SRU for transfer to the message center. In this mode of operation, assuming a keyboard input, character signals from keyboard 39 are transformed into binary code by keyboard matrix 40 and applied to data storage register 36'. The keyboard matrix 40 also sends a KEY signal to read-in control circuit 52 thereby activating it. The read-in control circuit 52 activates the local data section clock converter 51 which then provides clock pulses enabling the keyboard data to read into data storage register 36'. The KEY signal also prevents further reset signals from interrupting the entering of information. The display matrix 44 further includes means for adjusting the read-in of information to ensure proper entry. This output of the display matrix is coupled through data delay circuit 47 to ADDRESS register 29. This register then serves to terminate the local clock signals by inactivating the read-in control circuit upon completion of data entry.

Figure 4:
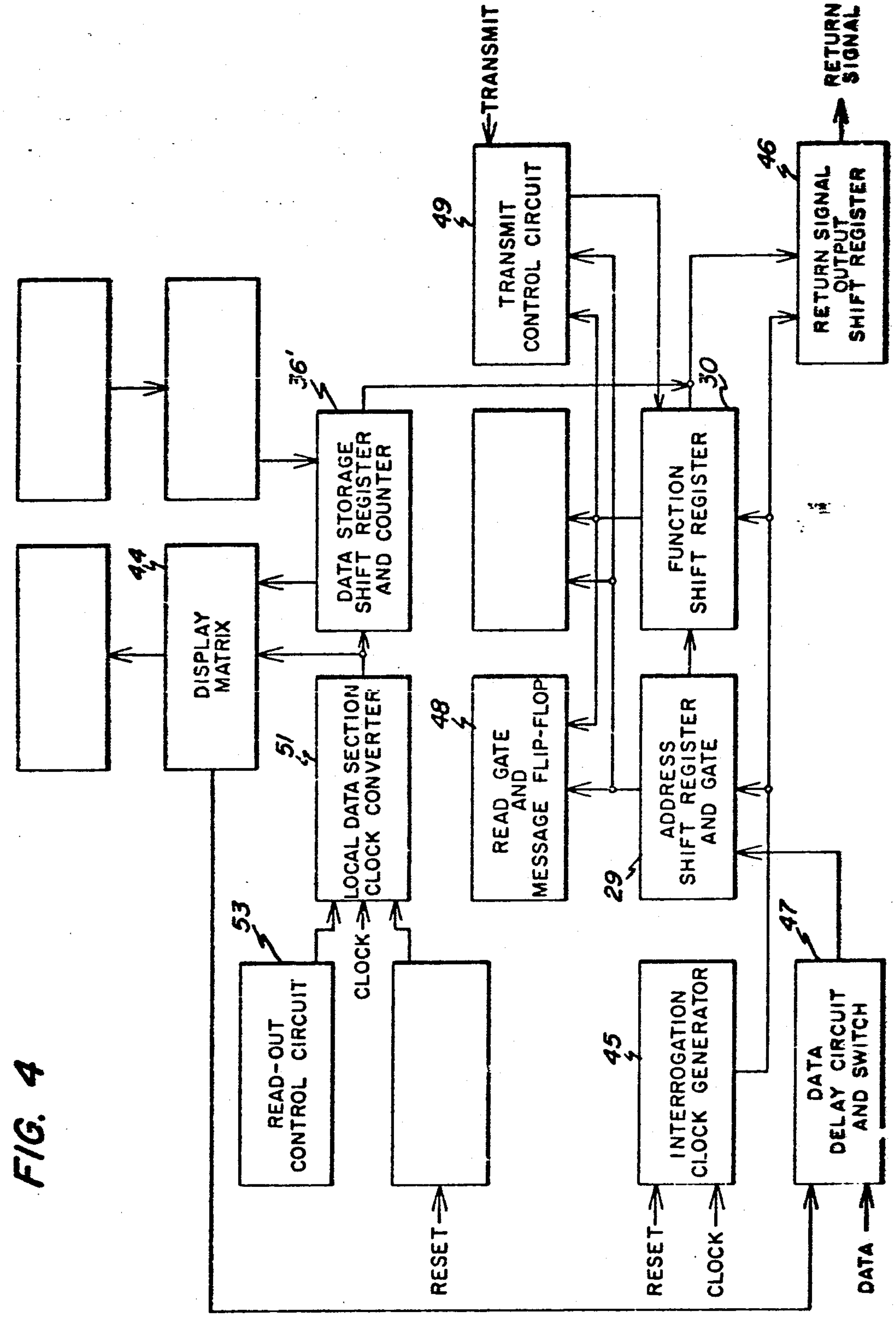
FIG. 4 is a functional block diagram of an SRU illustrating the "read" operation.

The READ function is illustrated in FIG. 4 and is performed as follows: The incoming signal from the message center passes through delay circuit 47 and enters registers 29 and 30. The simultaneous outputs representing the proper ADDRESS from 29 and the READ function from 30 activate the read gate and message flip-flop 48. The transmit-clear control circuit 49 is coupled to the function register 30 and enables the readout to take place; i.e., a TRANSMIT signal must be locally entered in order for the information within the SRU to be read out, otherwise the SRU will only return the ADDRESS and FUNCTION signals. REturning these signals to the message center serves to indicate proper operation of the SRU to the message center.

As the data storage register 36' is read out, the information flows out as discussed in connection with FIG. 2, viz, the FUNCTION (READ), ADDRESS, and information signals follow one another seriatim through the return signal register 46 while the information is read back into the data storage register 36' in the event it must be reread. The counter contained in 36', as in FIG. 2, assures that the data storage register is read out only once per READ signal. At the end of a readout, the counter in 36' disables readout control circuit 53, thereby stopping the readout.

Figure 5:
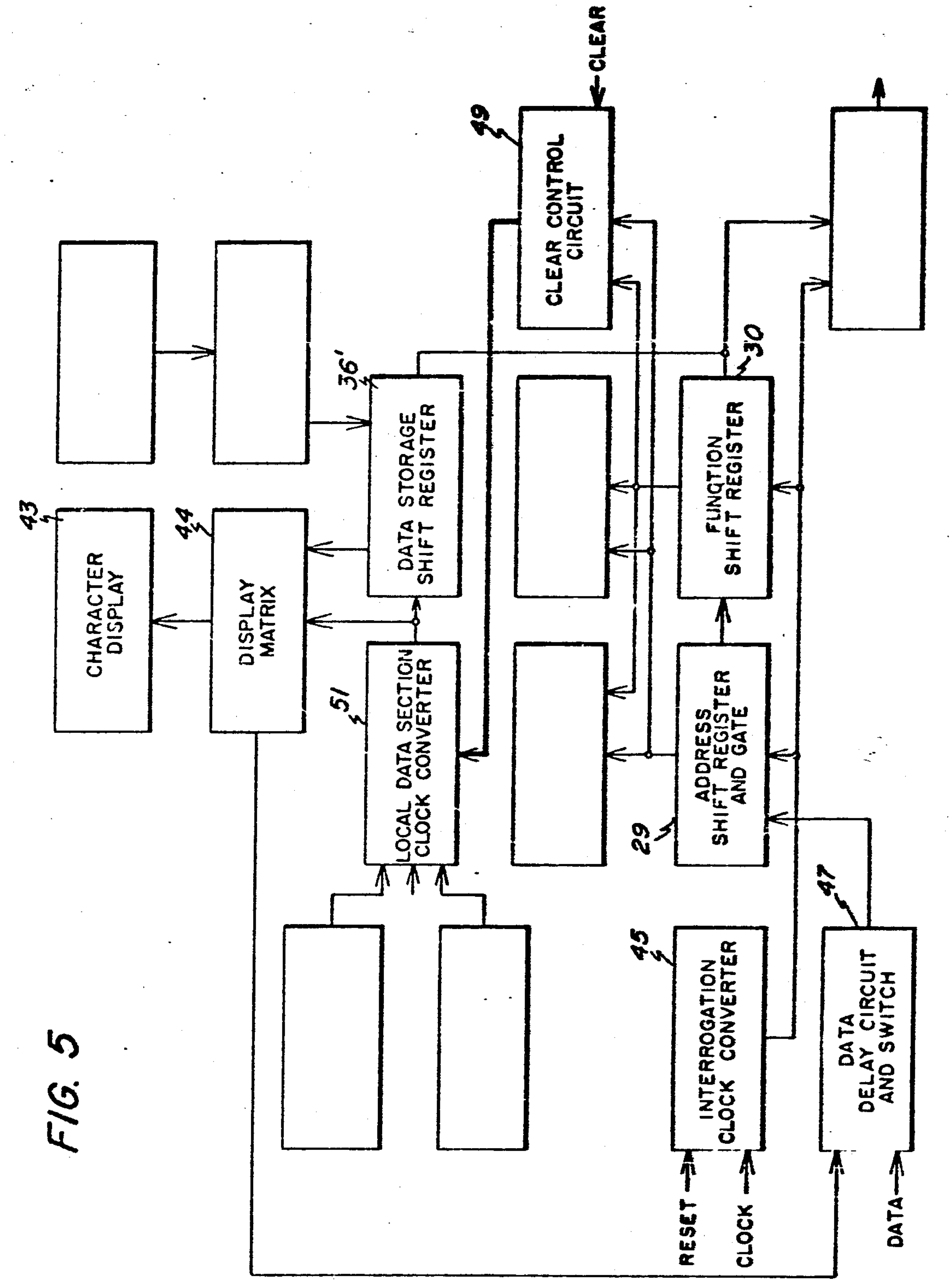
FIG. 5 is a functional block diagram of an SRU illustrating the "clear" operation.

The response of the SRu to a CLEAR signal is illustrated in FIG. 5. In this mode of operation, a properly addressed, CLEAR function signal is received via data delay circuit 47 and identified in registers 29 and 30. This signal generally follows the proper reception of information by the message center and clears register 36' of the information cycled back into it during readout. Upon receipt of the proper outputs from the registers 29 and 30, the message flip-flop is set, thereby enabling the clear control circuit 49 to clear the information out of data storage register 36' via clock converter 51, which is also activated. The clearing of register 36' also clears display interface 44. This serves to "erase" character display 44 and indicate to the subscriber that his message has been received. Obviously, any suitable form of proper receipt indicator could also be activated.

The clear function may also be performed by the subscriber by locally inserting a CLEAR signal directly into transmit-clear control 49. This would be done, for example, if an error were made entering information locally into data storage register 36'. This CLEAR signal may be made to erase all or only part of the information stored in data storage register 36'.

Figure 6:
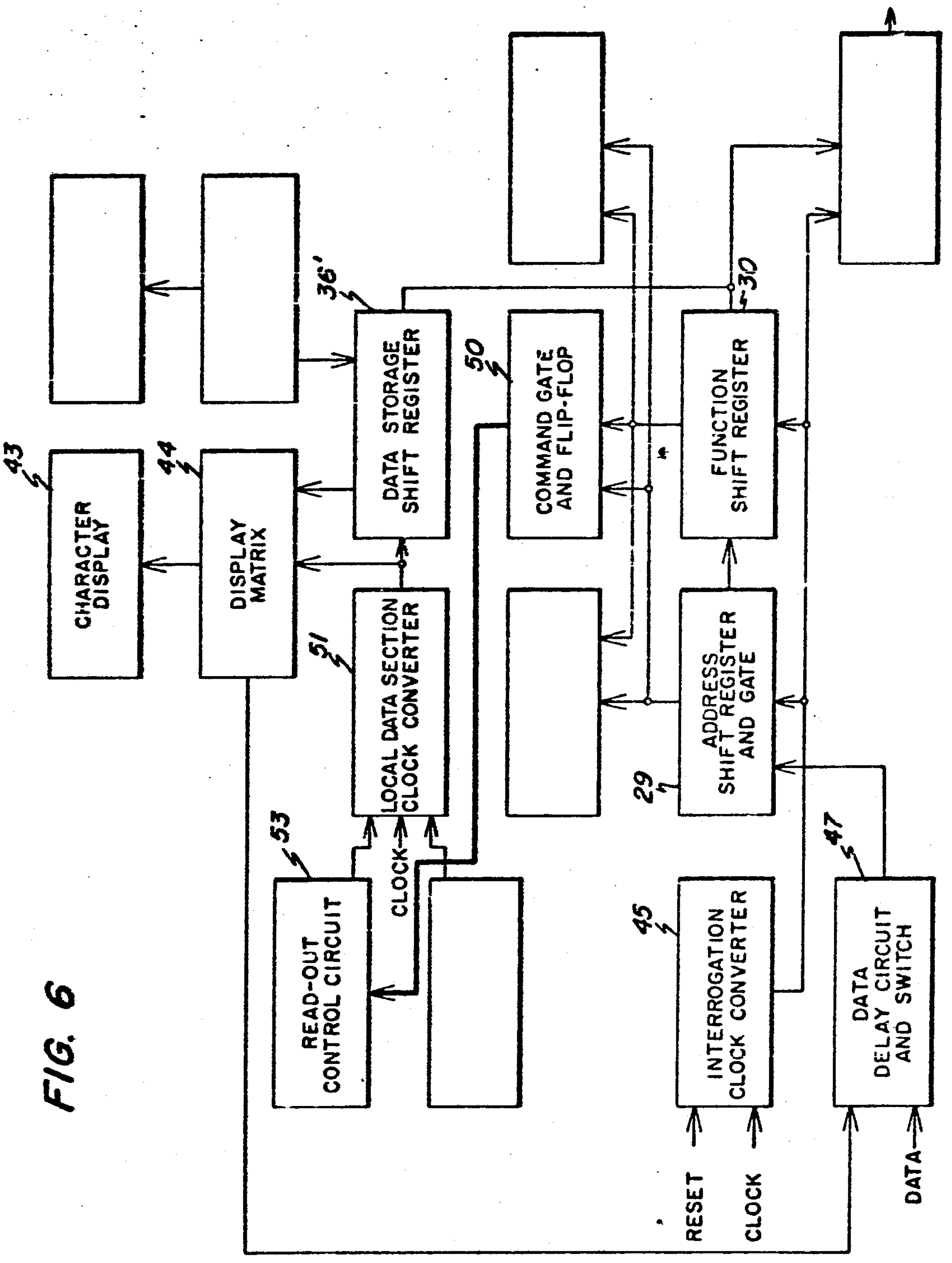
FIG. 6 is a functional block diagram of an SRU illustrating the "command" function.

FIG. 6 illustrates the response of the SRu to the COMMAND function signal. In this mode of operation, information from the message center is entered into the data storage register 36' of the SRU. It is in response to this COMMAND function signal that the SRU may display the information received and/or carry out particular tasks, determined by the accessory equipment controlled by the SRU.

In the COMMAND mode of operation, as before, the address register 29 identifies the signal thereby setting the message flip-flop in 48. The function register 30 and the output of the set message flip-flop activate the command gate and flip-flop 50 which, as previously mentioned, enables the readout control circuit 53. The readout control circuit controls local data section clock converter 51 which generates the clock signal necessary to transfer the information from the message center into the data storage register 36'. This information is entered via the line connecting function shift register 30 and data storage register 36'. The display matrix 44 and character display 43 then present the information to the subscriber.

While one embodiment of the present invention has been described, it will be apparent to those skilled in the art that various changes may be made. For example, various error-checking techniques have not been discussed since there are several conventional techniques compatible with the present invention. Further, the present invention may be sufficiently accurate for many uses without the added apparatus and expense necessary for error checking. Also, error would depend upon the information transmission rate and the capability of the components used in making the present invention.

While the present invention has been described as one terminal portion of a communication system, this is not to say that the functions of SRU and message center could not be combined to form an intermediate message center. For example, several smaller subscriber service areas could be combined by coupling several intermediate message centers to a larger central message center. This would be a horizontal or territorial combination. The SRUs and message centers could also be combined by function, i.e., vertically, where several message centers serve the same area but serve different functions. For example, one message center would serve commercial interests, department stores and the like. Since the SRU is designed to be used with television, to provide a complete communication link, a store could have an advertisement on television and take orders from subscribers. Another message center would serve educational interests. Books could be ordered from libraries or, where specific information is required from a large reference work, the necessary identification of the work is sent to the library, the microfilm card containing the information is selected, the appropriate portion is enlarged, and the picture is transmitted to the subscriber via a vacant TV channel. Scientific and other interests could be similarly served. This vertical combination is possible by virtue of the return signal register 46 which enables prefixing the message sent back to a message center, i.e., return-address coding.

What I claim as new and desire to secure by Letters Patent of the United States is:

1. A subscriber response unit comprising:
receiving means for receiving an incoming data signal, wherein the first data bit is a logic "1";
address-recognition means coupled to said receiving means for decoding said data signal and producing an enabling output signal only if the address in said data signal corresponds to the predetermined address of said address-recognition means;
function recognition means, coupled to said receiving means, having a plurality of outputs corresponding one each to a plurality of functions, for decoding said incoming data signal and producing an enabling signal on one of its outputs and depending upon the function to be performed as encoded on said data signal,
local data entry means for enabling the subscriber to enter local data signals into the subscriber response unit,
data storage means for storing information portions of the received data signal and information portions of locally entered data signals;
output means coupled to said data storage means;
means for performing the function indicated by the received data signal in response to said logic "1" and said enabling signals from said address and function recognition means and for performing the functions indicated by said local data signals.

2. A subscriber response unit as set forth in claim 1 wherein said output means comprises;

display matrix means for converting the output of said data storage means into a form suitable for display, and character-display means coupled to said display-matrix means for displaying the output of said data storage means.

3. A subscriber response unit as set forth in claim 1 wherein said output means comprises:

control means for carrying out operations automatically at the location of the subscriber response unit under the control of the output of the data storage means.

4. A subscriber response unit as set forth in claim 1 wherein said means for performing the function indicated by the received data signal comprises:

read control means responsive to said enabling signals from said address and function recognition means and said logic "1" in said function recognition means readout means responsive to said READ output signal for reading out said data storage means.

5. A subscriber response unit as set forth in claim 6 wherein said readout means comprises:

flip-flop means going into a logic "1" state in response to said READ output signal, switch means, responsive to said flip-flop means going into the logic "1" state, for connecting said address recognition means to said data storage means, and gating means coupled to said function recognition means and responsive to the logic "1" state of said flip-flop for allowing the function recognition means to be read out, whereby a signal will be sent out by the subscriber-response unit identifying itself, the function it is performing, and giving the desired information from its data storage means.

6. A subscriber-response unit as set forth in claim 5 wherein said readout means further comprises:

means for recycling the information read out of said data storage means back into the data storage means to preserve said information in the event it must be read out again.

7. A subscriber response unit as set forth in claim 6 wherein said readout means further comprises:

clearing means for clearing said data storage means of information recycled back into said data storage means upon proper readout of said subscriber-response unit.

8. A subscriber response unit as set forth in claim 1 further comprising:

local clock converting means for producing a local clock signal for the subscriber-response unit in response to a clock signal received by the subscriber-response unit, and wherein said local data entry is controlled by said local clock signal.

9. A subscriber-response unit as set forth in claim 8 wherein said local data entry means comprises a device utilizing a keyboard for use by a human operator.

10. A subscriber-response unit as set forth in claim 8 wherein said function-recognition means comprises means for recognizing a COMMAND code in said incoming data signal and generating a command enabling signal at one of said function-recognition means outputs, and said means for performing the function indicated by the received data signal comprises:

means responsive to the enabling output signal of said address-recognition means and said command enabling signal for entering information from said received incoming data signal into said data storage means under the control of said local clock signal.

11. A subscriber-response unit as set forth in claim 10 wherein said output means comprises:

display matrix means for converting the output of said data storage means into a form suitable for display, and character display means coupled to said display matrix means for displaying the output of said data storage means.

12. A subcriber-response unit as set forth in claim 10 wherein said output means comprises:

control means for carrying out operations automatically at the location of the subscriber-response unit under the control of the output of the data storage means, whereby said subscriber-response unit can act as a remote control unit in response to said received incoming data signal and as a local control unit in response to said local data signals.

13. A subscriber-response unit as set forth in claim 1 wherein said means for performing the function indicated by the received data signal comprises:

clear control means responsive to enabling signals from said address and function-recognition means for producing a CLEAR output signal, and means responsive to said CLEAR output signal for clearing data from said data storage means.

* * * * *

UNITED STATES PATENT OFFICE
CERTIFICATE OF CORRECTION

Patent No. 3,623,003 Dated November 23, 1971

Inventor(s) Terry L. Hewitt

It is certified that error appears in the above-identified patent and that said Letters Patent are hereby corrected as shown below:

Column 9, line 21 after "means" insert -- to produce a READ output signal, --

Column 9, line 24 cancel "6" and insert -- 4--

Column 10,line 40 cancel "i" and insert -- in --

Signed and sealed this 1st day of May 1973.

(SEAL)
Attest:

EDWARD M. FLETCHER, JR.
Attesting Officer

ROBERT GOTTSCHALK
Commissioner of Patents